United States Patent [19]

Perucchi et al.

[11] 3,994,483
[45] Nov. 30, 1976

[54] SPRING FOR MAINTAINING IN PLACE AN ELECTRIC COMPONENT AND FOR ENSURING ITS ELECTRIC CONTACT

[75] Inventors: Norberto Perucchi, Neuchatel, Switzerland; Michel Selot, Boudry, France

[73] Assignee: Ebauches S.A., Neuchatel, Switzerland

[22] Filed: Mar. 10, 1975

[21] Appl. No.: 557,065

[30] Foreign Application Priority Data
Mar. 29, 1974 Switzerland.................... 4386/74

[52] U.S. Cl.............................. 267/160; 200/67 D
[51] Int. Cl.².......................................... F16F 1/18
[58] Field of Search........... 179/100.2 CA, 100.2 D; 267/158, 159, 160, 164, 161, 163, 140–182; 248/204, 24; 58/3 R, 23 BA; 200/67 R, 67 A, 67 D, 67 DA, 67 DB, 38, 175, 186; 340/174.1 E

[56] References Cited
UNITED STATES PATENTS

| | | | |
|---|---|---|---|
| 2,700,079 | 1/1955 | Haydor | 267/159 |
| 3,668,668 | 6/1972 | Robltschek | 248/204 |
| 3,801,088 | 4/1974 | Piepers et al. | 267/164 |

*Primary Examiner*—James B. Marbert
*Attorney, Agent, or Firm*—Silverman & Cass

[57] ABSTRACT

A spring having three juxtaposed elastic blades connected to each other only at each end by two transversal portions. The central blade is cambered in a first direction and the two lateral or outside blades are cambered in an opposite second direction. The width of each blade diminishes to a minimum half-way between the middle of each end to equally distribute stresses applied to the spring, so that no lateral displacement of the spring will take place when it is compressed. The middle portion of the central blade has a protrusion adapted to make contact with an electrical component such as a battery. The two lateral blades each have a downwardly extending tongue at their center portion to bear against a bearing element, so there is electrical contact between the battery and the bearing element via the spring.

3 Claims, 5 Drawing Figures

SPRING FOR MAINTAINING IN PLACE AN ELECTRIC COMPONENT AND FOR ENSURING ITS ELECTRIC CONTACT

BACKGROUND OF THE INVENTION

The present invention relates to a spring for maintaining in place an electric component, especially a source of current, for instance for an electric timepiece, and for ensuring its electric contact.

Such springs, especially in their applications in the field of the watchmaking, must satisfy a number of conditions which give raise to some difficulties.

They must ensure a sufficient pressure for producing a good electric contact and a good maintaining in place of the electric component in spite of relative large tolerances of fabrication of these components, tolerances which can reach several tenths of mm. This condition means that the mechanical characteristic of the spring must be such that the force exerted by the spring, at least in the useful area, does not vary much with its rise.

It is moreover necessary that, during the deformations of the spring, its points of contact with the bearing element, for instance a frame of a watch-movement, and with the electric component, for instance a battery, move only along one direction, without any lateral movement with respect to the electric component. Such lateral movement would produce a deterioration of the coating surfaces of the bearing element, or of the electric component, conducive to an oxidation reducing the electric contact or even interrupting it.

Such a spring must also be comprised, in plane view, in a relatively small surface, for instance the plane surface of an electric battery used in watchmaking; moreover, the point of application of its force must be situated on an axis of symmetry so that the electric component can be held, on its opposite face, at three points. Its total height, in its condition of maximum of solicitation, that is to say when it is entirely compressed, must be weak and, in its application in the watchmaking, must not go beyond three-tenths of mm, for instance.

The number of its bearing points must not change during the normal solicitations while an accidental solicitation, beyond the maximum but inside the possibilities given by a correct mounting, must neither destroy the spring nor produce therein permanent deformations.

Its cost of manufacture must be the minimum possible.

The object of the present invention is to furnish a spring which responds to all these conditions.

SUMMARY OF THE INVENTION

The spring according to the invention is characterized by the fact that it comprises three elastic blades which are juxtaposed, connected to each other at their ends by two transversal positions, the central blade being cambered in a direction while the two lateral blades are cambered in the opposite direction, the whole in such a way that, this spring being interposed between a bearing element and the electric component, it bears by the top of its two lateral blades on one of the said elements —electric component and bearing element— and by the top of its central blade on the other one.

The drawing shows, by way of example, one embodiment of the object of the invention.

BRIEF DESCRIPTION OF THE DRAWING

Figure 1:
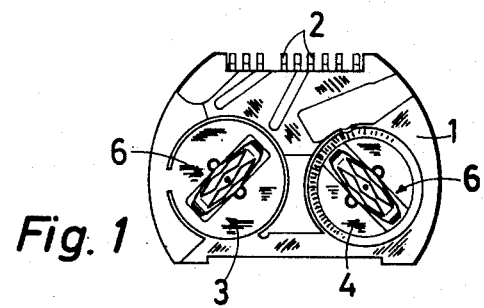
FIG. 1 is a plane view of a portion of a frame of an electric wrist-watch provided with two batteries each submitted to the action of a spring.

The frame represented in FIG. 1 comprises a small plate 1, made of plastic material, in the thickness of which are embedded metallic elements tongues 2 of which only are visible in the drawing and which ensure the electric connections of the circuit. This small plate 1 is provided with two circular recesses 3 and 4 intended to receive each a circular electric battery indicated in dot-and-dash lines at 5 in FIG. 3.

A spring 6, interposed between the battery 5 and the plate 1, is arranged on the bottom of each of the recesses 3 and 4. Each of these springs 6 comprises three juxtaposed blades, one of which, the central one, is designated by 6a, and the two others of which, the lateral ones, are designated by 6b. These blades are connected to each other, at their two ends, by two transversal portions 6c, of profiled cross section, as shown at FIG. 3, that gives them some rigidity.

Figure 3:
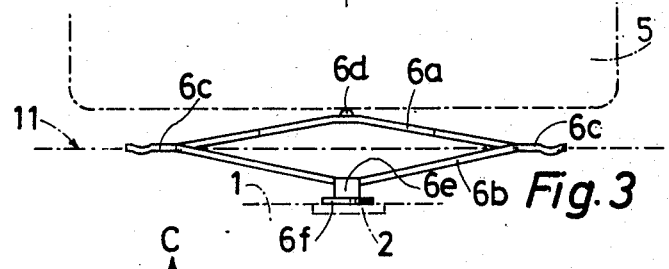
FIG. 3 is an elevational view of this spring.

The central blade 6a is cambered in one direction, being V-shaped bent, while the two blades 6b are cambered in the opposite direction, being also V-shaped bent, as shown at FIG. 3. The tops of these V are situated in the middle of the three blades 6a and 6b.

The central blade 6a is provided, at its middle part, with a protrusion 6d obtained by stamping, protruding on the dorsal face of the blade, and which is intended to enter into contact with the electric battery 5. The two lateral blades 6b are each provided with a tongue 6e, bent twice at right angle, the circular terminal portion 6f of which is intended to bear on the plate 1 or, more precisely, on a portion of the metallic elements 2 flush with the bottom of the recesses 3 or 4, so as to ensure the electric contact. In spite of the fact that this spring is arranged in such a way as to be submitted to no lateral displacement during its compression, so that it is not obligatory to secure it to the frame, there is an advantage to secure the tongues 6f to the metallic elements 2 so as to make it not removable.

Figure 2:
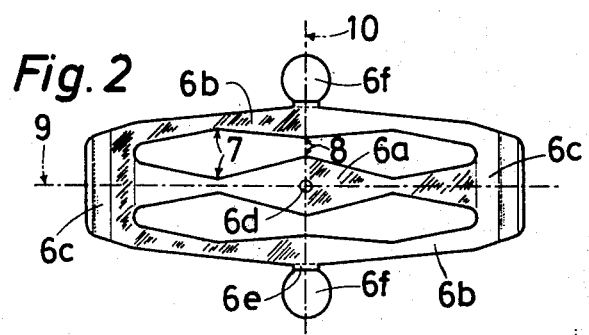
FIG. 2 is a plane view, at a larger scale, of one or the other of these two springs.
Figure 4:
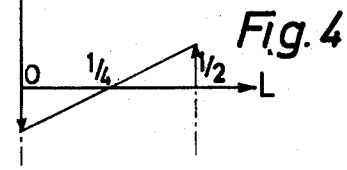
FIG. 4 is a diagram of the couple to which is submitted each half a blade of the spring, with respect to the length of this blade.
Figure 5:
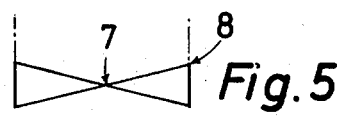
FIG. 5 is a diagrammatic plane view of half a blade of the spring indicating the width which this blade should theoretically have so that a regular distribution of the stresses in the said half-blade will be obtained.

So that the stresses to which the three blades of the spring are submitted be distributed equally in these blades, the width of these blades is diminishing, from their ends, for reaching a minimum, indicated at 7 in FIGS. 2 and 5, in a point situated at half a distance between each end and the middle part, then is increasing up to this middle part at 8. FIG. 4, on which have been indicated along the Y-axis the couple C to which is submitted the blade and along the X-axis the length L of this latter, shows that this couple passes, from the end of the blade situated at point 0 of the diagram to the length one-half, from a minimum to a maximum, for passing by a zero value at the point situated at the length L = ¼. There results, so that an equal distribution of the stresses in the blade be obtained, that the width of the blade must be maximum at each of its ends and at its middle part and minimum at half-a distance between these points.

The spring as disclosed and represented is provided with three planes of symmetry designated by 9, 10 and 11, the two first ones of which are represented in FIG. 2 and the third one of which is represented in FIG. 3. The two planes of symmetry 9 and 10 have for effect that the protrusion 6d is moving along a direction perpendicular to the general plane of the spring, during the compression of the spring, without any lateral displacement. The plane of symmetry 11 has for effect that the mechanical stresses are distributed equally in the two portions of the spring, i.e. the blade 6a on the one hand and two blades 6b on the other hand, that permits to store a maximum of energy.

This spring can, in case of a maximum stress, be totally crushed, so that its height then will be very small.

At last, this spring can be very cheaply obtained, by a mere operation of cutting-stamping.

What we claim is:

1. Spring for maintaining in place an electric component, especially a source of current, and for ensuring its electric contact, comprising: three elastic blades which are juxtaposed, connected to each other at their ends by two transversal portions, said blades including stress distributing means to prevent lateral displacement of said spring during compression, said stress distributing means including the width of each blade diminishing from each of its ends for reaching a minimum width situated substantially at half a distance between each end and its middle portion, then increasing in width up to its middle portion, the central blade being cambered in a direction while the two lateral blades are cambered in the opposite direction, the whole in such a way that, this spring being interposed between a bearing element and the electric component, it bears by the top of its two lateral blades on one of the said elements —electric component and bearing element— and by the top of its central blade on the other one.

2. Spring for maintaining in place an electric component, especially a source of current, and for ensuring its electric contact, comprising: three elastic blades which are juxtaposed, connected to each other at their ends by two transversal portions, said blades including stress distributing means to prevent lateral displacement of said spring during compression, the central blade being cambered in a direction while the two lateral blades are cambered in the opposite direction, the lateral blades are each provided, at their middle portion, with a bent tongue, the whole in such a way that, this spring being interposed between a bearing element and the electric component, it bears by the bent tongues of its two lateral blades on one of the said elements —electric component and bearing element— and by the top of its central blade on the other one.

3. Spring as claimed in claim 2, in which said tongues are arranged in such a way as to permit their securing to the element —electric component or bearing element— on which they bear.

* * * * *